Aug. 13, 1929.  S. G. SMITH  1,724,623
VEHICLE HEADLIGHT
Filed April 5, 1928   2 Sheets-Sheet 1
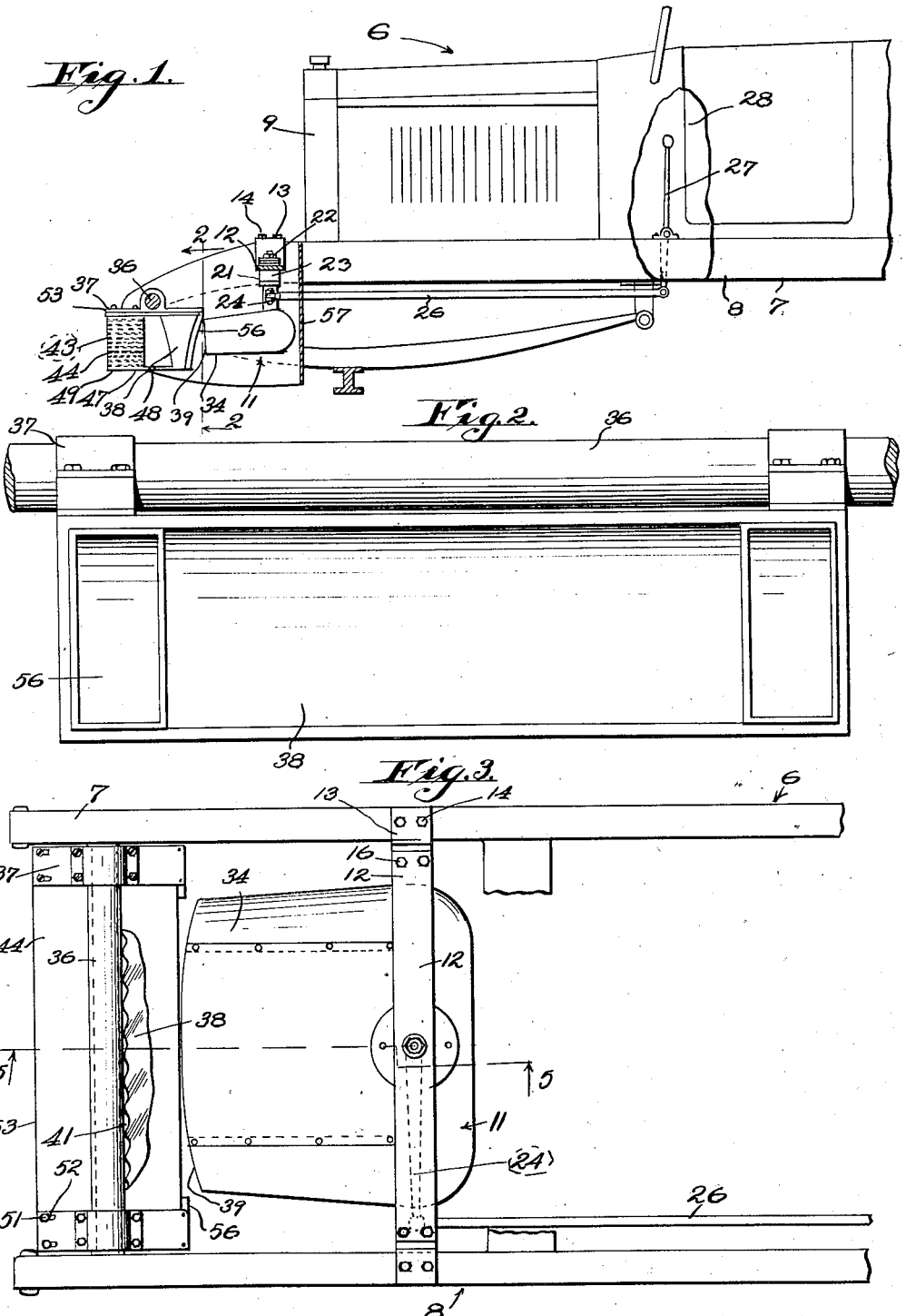
Inventor
S. G. Smith
by Hazard and Miller
Attorneys

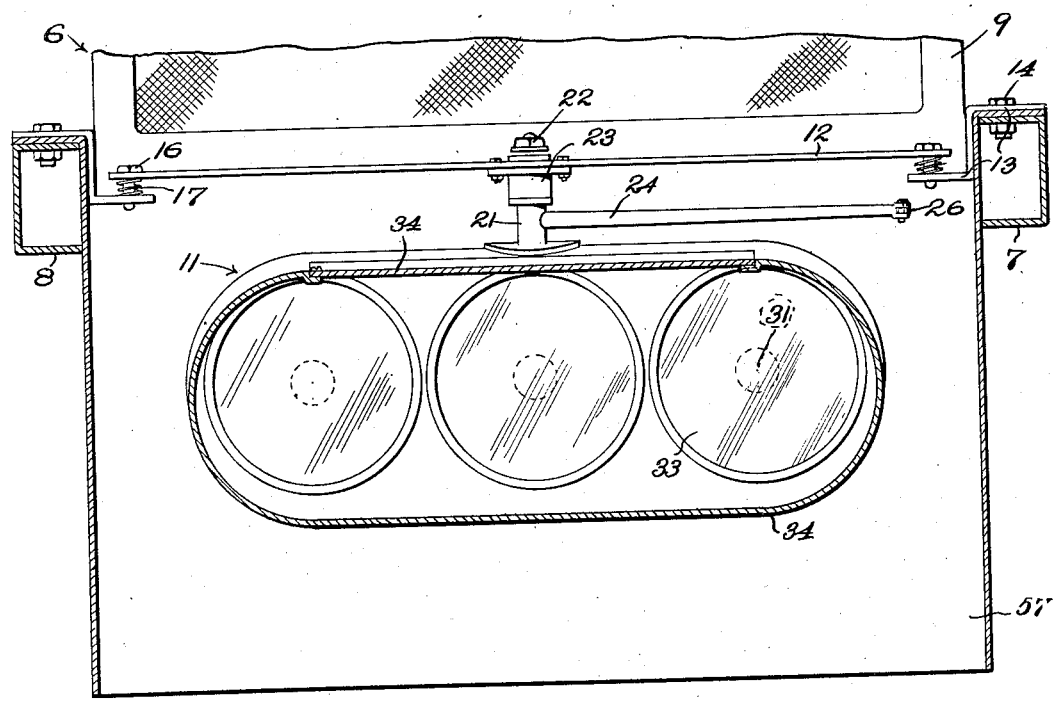

Patented Aug. 13, 1929.

1,724,623

UNITED STATES PATENT OFFICE.

SHERMAN G. SMITH, OF LOS ANGELES, CALIFORNIA.

VEHICLE HEADLIGHT.

Application filed April 5, 1928. Serial No. 267,565.

This invention relates to vehicle headlights, and more particularly to headlights for autotmobiles.

An object of the invention is to provide an improved headlight especially adapted for use upon automobiles, which is capable of efficiently illuminating the roadway in front of the vehicle and yet which is concealed from view so as to obviate the danger associated with the glare of ordinary headlights, which tends to blind persons in front of a vehicle carrying such headlights.

Another object is the provision of a vehicle headlight capable of being turned in respect to the vehicle, to illuminate that side of the road to which the driver of the vehicle contemplates turning.

Another object is the provision of a headlight capable of being turned as described, having means associated therewith for tinging the light emanating from the headlight, with a color so as to serve as a warning to other vehicles and to pedestrians that such a turn is contemplated.

Another object is the provision of a headlight capable of being turned as described, which may be installed for manual operation or for automatic operation in conjunction with the steering apparatus of the vehicle.

A further object is the provision of a vehicle headlight having improved means associated therewith for diffusing the light laterally, and positive means for limiting the vertical diffusion of the light for the purpose of eliminating dangerous glare.

With the foregoing and other objects in view which will be made manifest in the following detailed description and specifically pointed out in the appended claims, reference is had to the accompanying drawings for an illustrative embodiment of the invention, wherein:

Figure 1 is a side elevation of a portion of a motor vehicle upon which the improved headlight of the present invention is installed, portions being broken away to better reveal the nature of the invention.

Fig. 2 is an enlarged, vertical, sectional view taken on the line 2—2 of Fig. 1, and the direction of view being indicated by the arrows.

Fig. 3 is a top plan view of a portion of the chassis of the motor vehicle of Fig. 1, with the headlight mounted thereupon.

Fig. 4 is a vertical, transverse, sectional view, the plane of section being taken upon the line 4—4 of Fig. 5, and the direction of view being indicated by the arrows.

Fig. 5 is a vertical, longitudinal, sectional view, the plane of section being indicated by the line 5—5 of Fig. 3.

In terms of broad inclusion, the headlight of the present invention includes means for concealing the headlight from the view of persons in front of the vehicle carrying the headlight. A lens is provided for directing the light emanating from the headlight horizontally; and this lens is arranged to diffuse laterally the light passing therethrough. Means are further provided for positively preventing vertical diffusion of the light so as to eliminate dangerous glare. The headlight is arranged to have pivotal movement imparted thereto in a horizontal plane to illuminate that portion of the roadway into which the driver of the vehicle contemplates turning; and colored screens are arranged to impart color to the light of the headlight when it is so shifted from that position in which it directs its light directly ahead of the vehicle, with the result that a warning is offered to other vehicles and to pedestrians that such a turn is contemplated.

In greater detail, the preferred embodiment of the present invention is herewith shown and described as being mounted upon a motor vehicle indicated in its entirety at 6. A headlight is mounted upon the forward end of the vehicle preferably between the front ends of the side channels 7 of the chassis 8, in front of, and below the radiator 9.

A headlight housing 11 is supported upon a bar 12 extending transversely of the chassis 8. Each end of the bar 12 is supported upon a bracket 13, and each of these brackets is rigidly secured to the associated side channel 7 as by the bolts 14. The connection between the supporting bar 12 and the brackets 13 is such that vertical adjustment of the housing 11 in respect to the chassis 8 is possible. This may be accomplished by extending a bolt 16 loosely through each end of the bar 12 to be threaded into one of the brackets 13, and placing a coil spring 17 about each of the bolts 16 and under compression between the associated bracket 13 and the bar 12.

With this arrangement, the housing 11 may be lowered in respect to the chassis 8, by tightening the bolts 16 against the action of the springs 17, and may be elevated by loosening the bolts 16 to permit the springs 17 to expand and raise the bar 12, and with it the housing 11.

The housing 11 is carried by a vertical bar 21 which extends upward to be journalled in the transverse bar 12. A nut 22 threaded upon the upper end of the vertical bar 21, prevents displacements thereof; and a bushing 23 rigidly secured to the under side of the transverse bar 12, provides a journal for the vertical bar 21 to permit rotary movement of the housing 11 in a horizontal plane. An arm 24 rigid with the vertical bar 21, extends to one side, permitting the housing 21 to be operably connected either to the steering apparatus of the vehicle to effect rotational movement of the housing 11 automatically when the vehicle is being turned, or else through a suitable link 26 to a lever 27 or its equivalent, convenient to the hand of the driver of the vehicle. With the latter arrangement, the direction in which the housing 11 points, may be regulated at will from the driver's compartment 28.

Preferably, a plurality of light sources 31 are contained within the after end of the housing 11; and each light source 31 is provided with suitable means for projecting its light toward the front of the housing 11 such as a conventional reflector 32 and lens 33. A shield 34 extends forwards and downwards from the housing 11, for confining the light issuing from the light sources 31, to a restricted area as clearly shown in Fig. 5.

Means for directing light from the headlight horizontally in front of the vehicle, are rigidly mounted upon the forward cross member 36 connecting the front ends of the side channels 7 of the chassis 8. A pair of brackets 37 are rigidly mounted upon the cross member 36 to support a lens 38. This lens 38 is rectangular in both top and bottom plan, and in cross section is shaped like the upper half of a biconcave lens. This shape is clearly shown in Fig. 5. The projecting lens 38 is so positioned by the brackets 37 that it is directly in front of the open end 39 of the shield 34 so that all the light emanating from the light sources 31 is received by the lens 38 and directed horizontally forward. A plurality of corrugations 41 are provided in the forward surface of the lens 38 to diffuse laterally the light passing therethrough. However, to provide positive means for preventing vertical diffusion of the light, a plurality of spaced horizontal vanes 42 are mounted in a casing 43 in front of the lens 38, with the result that any light rays issuing from the lens 38 in a direction other than substantially horizontal, will be intercepted by the vanes 42.

Both the lens 38 and the casing 43 for the vanes 42, are mounted within a suitable housing 44 which is preferably dust proof. The forward end of the housing 44 is provided with a pane of glass 46. The bottom 47 of the housing is divided into two sections which are hingedly connected as at 48. The casing 43 for the vanes 42, is supported upon the forward one 49 of these two sections, and upon an adjusting screw 51 which extends loosely through a slot 52 in the top 53 of the housing 44, to be threaded into the top of the casing 43.

A spring 54 is under compression between the top 52 of the housing 44 and the top of the casing 43, so that by tightening the screw 51, the casing 43 may be swung upon its hinged mounting 48 to adjust the vanes upwards, and by loosening the screw 51, the vanes may be adjusted downwards.

A screen 56 of colored, translucent material, is positioned on each side of the lens 38; and preferably, the color of each screen 56 is in sharp contrast to that of the other screen, e. g., that on the right hand side of the vehicle might be green, and that on the left hand side of the vehicle might be amber. It is to be understood however, that the shield 34 confines the light issuing from the housing 11 to the lens 38 when the housing is in that position in which it directs its light directly forward of the vehicle, with the result that when so positioned, all of the light emanating from the headlight is white light. However, when the housing 11 is turned to either side, the shield 34 is likewise turned to permit a portion of the light to pass through one of the colored screens 56. As a result, that portion of the road toward which the headlight has been turned, will be tinged a color corresponding to that of the associated colored screen to serve as a warning to the drivers of other vehicles, and to pedestrians, that the driver of the vehicle 8 is contemplating such a turn.

In its preferred form, the entire headlight structure including the housing 11, shield 34 and the housing 44, are positioned within the apron 57 with which motor vehicles are conventionally supplied, depending from the forward ends of the side channels 7 of the chassis and from the radiator 9. With this arrangement, the conventional headlights may be done away with, with the result that the stream-line appearance of the vehicle may be considerably enhanced.

More important than this result however, is the fact that I have provided an improved type of headlight which is capable of efficiently illuminating the roadway before the vehicle, without the danger of glare which is associated with the customary headlights. The inclusion of the horizontal vanes 42, positively prevents the possibilty of vertical diffusion of the light which would otherwise tend to produce such glare. The headlight proper, is entirely concealed from view, so that not only is glare of the light issuing from the reflectors 32 prevented, but it is also impossible for a person in front of the vehicle to be bothered by the light rays issuing directly from the light sources 31, as is the case with the ordinary type of headlights. The shield 34 directs the light angularly downwards onto the lens 38 which serves to bend the rays of light to permit them to issue therefrom horizontally through the vanes 42. The construction described has the added advantage of making it possible to warn drivers of other vehicles, and pedestrians, that a turn is contemplated.

An additional advantage gained through the use of my headlight results from the fact that the light issues therefrom below and closely adjacent the front bumper, if the vehicle is so equipped. A portion or all of the after face of the bumper may be given a finishing coat of material adapted to reflect part of the light from the headlight backwards, to partially illuminate the front of the vehicle to make it more easily discernible by pedestrians and the drivers of other vehicles.

Various changes in the details of construction may be made without departing from the spirit and scope of the invention as defined by the appended claims.

I claim:

1. In combination with a vehicle frame comprising a pair of spaced side members, a rod joining the forward ends of said side members, light directing means depending from said rod, a source of light, and means for projecting light emanating from said source into said directing means.

2. In combination with a vehicle frame comprising a pair of spaced side members, a rod joining the forward ends of said side members, light directing means depending from said rod, a source of light, means for projecting light emanating from said source into said directing means, and means for adjusting said projecting means in respect to the directing means.

3. In combination, a vehicle comprising a frame, light directing means carried by the frame adjacent the forward end thereof, a light source carried by the frame independently of said directing means, and means for projecting light emanating from said source into said directing means.

4. A vehicle headlight comprising in combination, light directing means adapted to be mounted in fixed position upon a vehicle, a light source adapted to be mounted on the vehicle independently of said directing means, and means for projecting light emanating from said source into said directing means.

5. A vehicle headlight comprising in combination a source of light mounted on the vehicle, and light directing means mounted on said vehicle independently of said light source, and comprisng a lens adapted to direct the light issuing therefrom in horizontal paths, and a plurality of horizontally disposed vanes interposed before said lens.

6. A vehicle headlight comprising in combination a source of light mounted on the vehicle, and light directing means mounted on said vehicle independently of said light source, and comprising a lens adapted to direct the light issuing therefrom in horizontal paths, means for diffusing horizontally light issued from said lens, and a plurality of horizontally disposed vanes interposed before said lens.

7. A vehicle headlight comprising in combination a source of light mounted on the vehicle for pivotal movement about a vertical axis, means for controlling movement of said light source, and light directing means mounted on said vehicle independently of said light source, and comprising a lens elongated transversely of the vehicle and adapted to direct light issuing therefrom in horizontal paths, and a plurality of horizontally disposed vanes interposed before said lens.

8. A vehicle headlight comprising in combination a source of light mounted on the vehicle for pivotal movement about a vertical axis, means for controlling movement of said light source, and light directing means mounted on said vehicle independently of said light source, and comprising a lens elongated transversely of the vehicle and adapted to direct light issuing therefrom in horizontal paths, a plurality of horizontally disposed vanes interposed before said lens, and a translucent colored screen at each end of said lens adapted to be illuminated when the light source is turned from straight ahead position.

9. A vehicle headlight comprising in combination a source of light mounted on the vehicle, and light directing means mounted on said vehicle independently of said light source, and comprising a lens adapted to direct the light issuing therefrom in horizontal paths, and a plurality of horizontally disposed vanes interposed before said lens, and a shield between said source and said directing means for directing all the light issuing from said source into the projector.

10. A vehicle headlight comprising in comprising in combination a source of light mounted on the vehicle, and light directing means mounted on said vehicle independently of said light source, and comprising a lens adapted to direct the light issuing therefrom in horizontal paths, means for diffusing horizontally light issuing from said lens, and a plurality of horizontally disposed vanes interposed before said lens, and a shield between said source and said directing means for directing all the light issuing from said source into the projector.

In testimony whereof I have signed my name to this specification.

SHERMAN G. SMITH.